W. S. CARR.
ATTACHING PIPES TO WATER CLOSET BASINS.
No. 20,550.   Patented June 15, 1858.
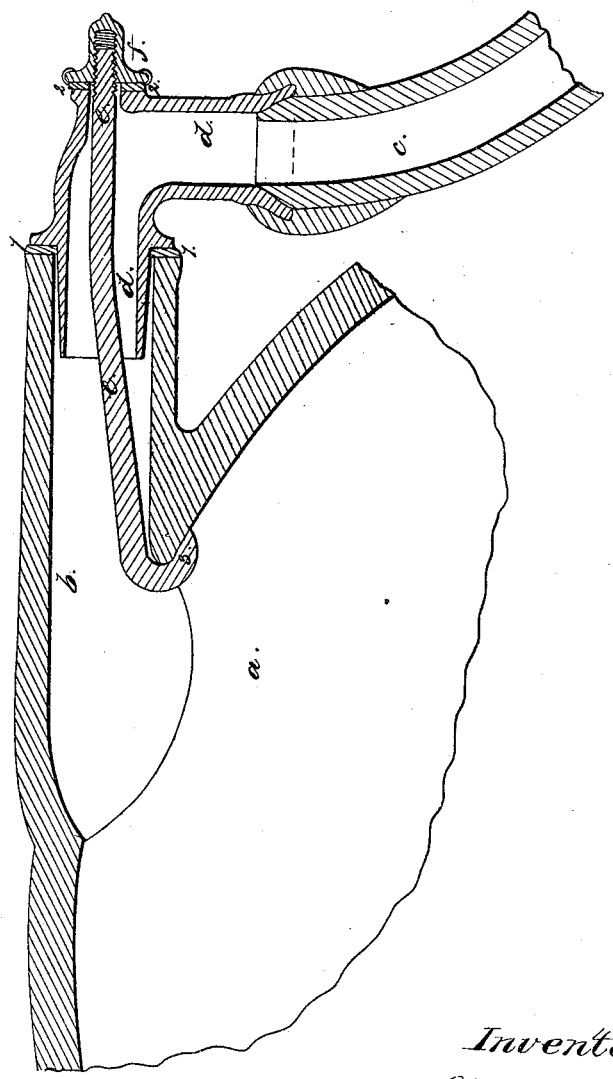
Witnesses:
Lemuel W. Sewell
James S. Diack
Inventor:
W. S. Carr

UNITED STATES PATENT OFFICE.

W. S. CARR, OF NEW YORK, N. Y.

ATTACHMENT OF PIPES TO WATER-CLOSET BASINS.

Specification of Letters Patent No. 20,550, dated June 15, 1858.

*To all whom it may concern:*

Be it known that I, WILLIAM S. CARR, of the city, county, and State of New York, have invented, made, and applied to use a certain new and useful Improvement in Means for Attaching Metallic Sockets to the Arms of Water-Closet Basins; and I do hereby declare that the following is a full, clear, and exact description of the construction and operation of the same, reference being had to the annexed drawing, making part of this specification, wherein a sectional plan of my improvement is shown as applied to the arm of a water-closet basin.

In attaching the pipe that conveys the water to the basins of water closets, the practice has heretofore been to insert the pipe and putty the joint up tightly around said pipe; this is not a neat operation, and cannot be relied upon for tightness, particularly under heavy pressures, and besides this in the repairs of closets this connection has often to be broken, and in so doing the arm of the basin is often injured.

The nature of my said invention consists in a metallic socket attached to the end of the pipe, and connected to the arm of the basin by a rod passing through said arm, one end of which attaches to the basin itself, and the other end passes through said socket and is provided with a nut, the parts being rendered water tight by leather or equivalent washers, whereby the said socket and its pipe can be connected or disconnected from said arm with the greatest facility, the joint is perfectly water tight, and is not injured by being disconnected for repairs.

In the drawing $a$, is the basin of the water closet formed either of metal or earthen ware, and provided with a hollow arm $b$, through which the water passes into said basin, to wash the same out, in any usual manner; or the said basin may represent a urinal with its arm $b$, in the well known manner. $c$, is the lead or other pipe, through which the supply of water passes, soldered onto my metallic socket $d$, connecting the pipe $c$, to the arm $b$, by means of the rod $e$. This rod $e$, is provided with a hook or hooks 3, taking over the edge of the basin at the junction of the pipe or arm $b$; or over a suitable cross piece at said points; and provided with a screw at the other end passing through the socket $d$, and receiving a nut $f$, by the tightening of which the said socket $d$ is firmly pressed to the end of said arm $b$. 1, is a washer between said arm $b$, and the socket $d$, to make a tight joint and 2, is a washer for a similar purpose beneath the nut $f$. The size and shape of this socket $d$, must be varied according to the pipe $c$, and arm $b$, and also the direction in which the pipe $c$, approaches to the arm $b$.

What I claim as my invention and desire to secure by Letters Patent is—

The socket $d$, rod $e$, and nut $f$, connecting the pipe $c$, and arm $b$, substantially as and for the purposes specified.

In witness whereof I have hereunto set my signature this 27th day of May, 1858.

W. S. CARR.

Witnesses:
LEMUEL W. SERRELL,
JAMES T. DIACK.